United States Patent Office 2,901,811
Patented Sept. 1, 1959

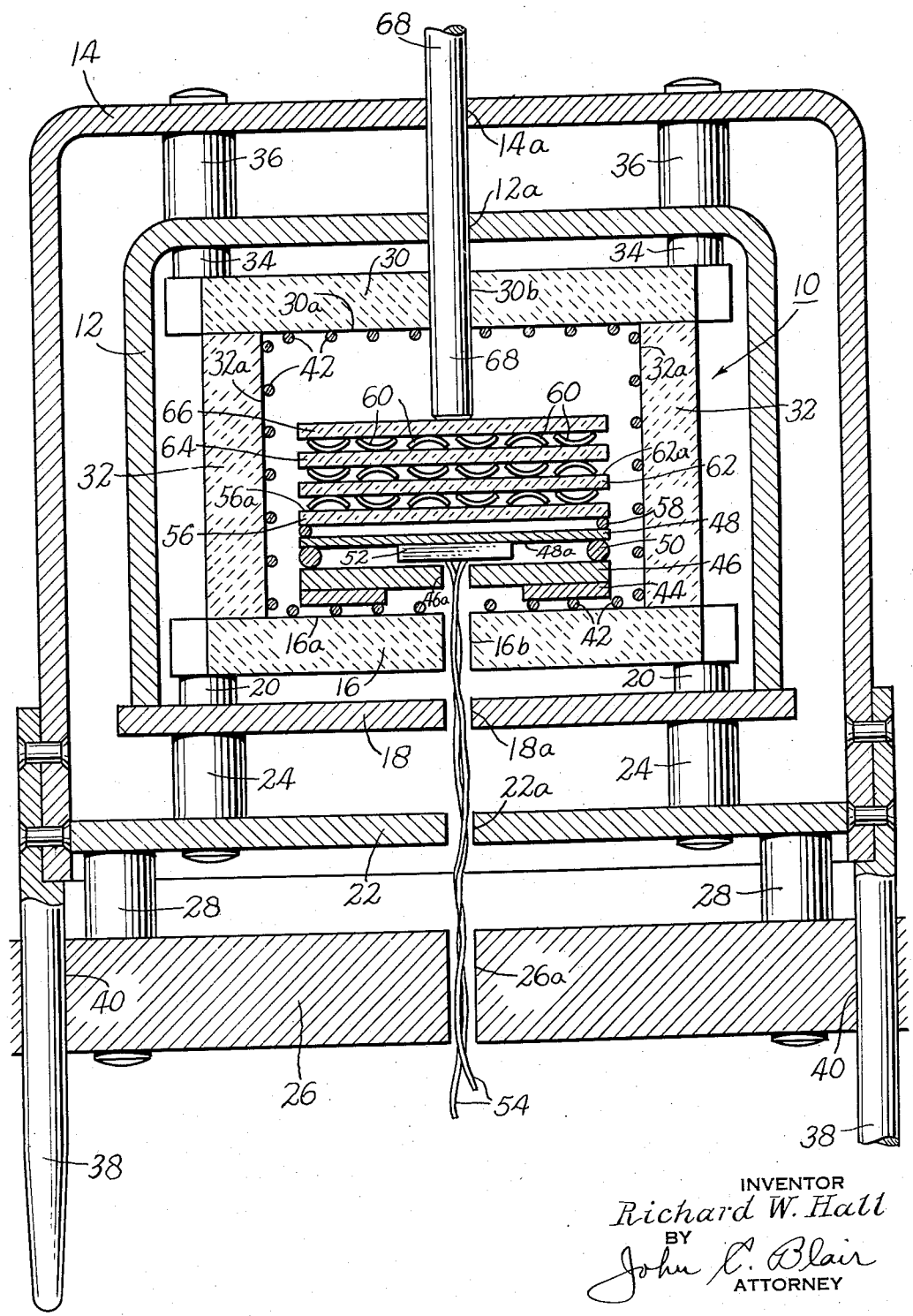

2,901,811
PROCESS FOR FLATTENING THERMISTOR FLAKES

Richard W. Hall, Springdale, Conn., assignor to Barnes Engineering Company, Stamford, Conn., a corporation of Delaware Application October 31, 1955, Serial No. 543,672

8 Claims. (Cl. 25—156)

This invention is concerned with an improved process for shaping thermally sensitive elements. More particularly, it concerns an improved process for shaping or flattening flakes of thermally sensitive resistance material used to detect infra-red radiation in thermistor bolometers within very exacting tolerances.

Thermistor bolometers, which are electrical devices sensitive to infra-red radiation use small, thin flakes of thermally sensitive resistance material to detect impinging infra-red energy. In general the flakes are cemented to the flat surface of a block of thermally conducting, electrically insulating material which conducts heat away from the flake, and is therefore known as a thermal sink. To obtain a radiation sensitive unit with fast response speed, the cement layer which joins the flake and backing block should be of minimum thickness. However, when flakes are made according to conventional processes they are curved or bowed at the edges, and if joined to a backing block with the thinnest layer of cement possible at the central portion thereof, the upward curl of the edges requires a much thicker cement layer. If the flakes are placed on the block with their edges curled downwardly, the thick cement layer is at the central portion. Thus this flake curvature results in cement layers whose average thickness is approximately two or three times the minimum possible thickness if the flake is flat. Since the thermal conductivity of the cement layer is approximately 1/100 that of the average backing block, this condition causes slow response speeds for units made from unflattened flakes because of greater thermal resistance between the flake and the block. A further disadvantage in using curled flakes lies in the resulting uneven heat conduction from the flake. Where the cement layer is very thin in the central portion, heat is conducted away rapidly while at the thick edges conduction is comparatively slow. In certain applications the flakes may be sandwiched between two layers of material, one or both of which may be transparent to infra-red energy, in which event it is also desirable to obtain very flat flakes to minimize the thickness of the adjacent cement layers. Other applications require flakes mounted on optically curved or shaped surfaces. Flakes made by usual techniques must be re-shaped to fit these surfaces and this invention is directed to such re-shaping as well as flattening.

Thermistor flakes are made by mixing in a ball mill metallic oxides, for example oxides of manganese, nickel, iron, cobalt, a plasticizer and a solvent. After sufficient mixing, the material is removed from the mill and spread to dry on glass plates. When dry, the sheet so formed is cut into small flakes and placed on Alundum plates in a furnace to sinter at a high temperature driving off the solvent and bonding the oxides and plasticizer into a coherent material. Although the flakes are flat when entering the sintering furnace, the high temperatures encountered there cause their edges to curl and bodies to warp. For example, in a standard flake 10 microns thick, this curvature may generally range between 15 and 200 microns measured from the plane of the lower surface of the flake to the lower surface of the curled edge. As noted above such curvature is unacceptable if the flakes are to be used on flat surfaces. The amount of curvature which is acceptable is of the order of 5 to 10 microns, but this is rarely found in flakes removed from the sintering furnace. Where the flakes are curved to be bonded to a curved surface they are seldom curved to proper shape or degree when made according to present practices. Obviously if the flakes are not shaped to fit the curved surface to which they are to be bonded, the attaching cement layers will be non-uniform in thickness; the result is deterioration in bolometer performance.

Attempts have been made to flatten curled flakes by sandwiching them between flat-surfaced Alundum plates and reheating the flakes to a high temperature. However, this process results in great breakage principally because the Alundum plates and the flakes have different coefficients of thermal expansion. Further, Alundum particles break loose from the plates and adhere to the flakes causing some deterioration in flake performance. Flakes so flattened are usually not flat enough to be acceptable for use with high speed thermistor bolometers.

Accordingly it is an object of this invention to provide an improved method of shaping flakes to correspond to the surface to which they are to be attached. Another object is to provide a method of the above character by which flakes of various shapes may be made to fit curved or irregularly shaped surfaces. A still further object is to provide a method of the above character for making flat flakes in production quantities simply and economically. A final object is to provide a method of the above character for making shaped flakes wherein appreciable breakage of the flakes is eliminated. Other objects of the invention will be in part obvious and in part appear hereinafter.

This invention accordingly comprises the several steps and the relation of one or more such steps with respect to each of the others thereof which will be exemplified in the method hereinafter disclosed, and the scope of the invention will be indicated in the claims.

For a fuller understanding of the nature and objects of the invention, reference should be had to the following detailed description taken in connection with the accompanying drawing in which the single figure is a vertical cross-section of a furnace which can be used in the flattening process of this invention.

In making the flakes, a mixture of oxides, a solvent, and an organic plasticizer is prepared. The preferable oxides are either a mixture of manganese oxide and nickel oxide, or a mixture of manganese oxide and nickel oxide with cobalt oxide although other materials might be used. The oxide powder is mixed with an organic plastic material such as polyvinyl butyral cement, a flexible thermo-plastic resin which is diluted with a solvent such as methyl ethyl ketone. This mixture is poured into a container to which are added steel balls and the whole is rotated or milled for several hours.

When mixing is substantially complete and the particles are sufficiently dispersed in the reduced plastic, the material is spread on a glass plate with a doctor blade and allowed to dry. When sufficiently dry to form a coherent sheet, the material is dampened with distilled water, peeled off the glass plate and allowed to dry on absorbent paper. The film is then cut to the desired flake size with a guillotine type microtome similar to those used in slicing tissue samples. The flakes are cut 20 to 30% larger than the final desired size to allow for shrinkage during sintering. Such flakes are laid on an Alundum plate and placed in a furnace for sintering. The furnace is raised to a high temperature, approximately 1250° C., and held there for a few minutes; it is then dropped to 850° C. for about one hour. After cooling, the sintered flakes are coherent and fragile, but as previously explained they are curled to such an extent that they are not usable high perforance bolometers, but must be shaped for this purpose.

The first step in the shaping process is to clean the flakes. This is accomplished by placing them on a vacuum chuck and cleaning Alundum particles from the flakes with a camel's hair brush or small wire. They may also be cleaned by cooking in butyl alcohol for a short period, or agitated, drained and allowed to dry. If the particles are left on the flakes they may damage the flakes themselves as well as the plates on which the flakes are laid during the flattening process.

After cleaning, the flakes are laid out on ground and polished flat plates approximately one inch by one inch by ⅛ inch. These plates may be glass, or other material capable of withstanding the high temperature to which the flakes are subjected in the shaping process. I have found that such materials as a glass composed of 96% silica and 4% boron, a glass of 100% silica, or synthetic sapphire (crystalline $Al_2O_3$) are suitable for this purpose. These materials are preferred over Alundum for this use since they have a coefficient of thermal expansion similar to the flake material and can be ground and polished flat or in a variety of shapes with a relatively smooth surface.

A plurality of flakes are placed on each plate and a second plate is then placed on the flakes to be supported by the curled flakes. Thus a sufficient number of flakes must be placed on each plate so that the upper plate will be supported without flake breakage. A method of placing these plate-flake "sandwiches" in a furnace is illustrated in the drawing wherein a cubical enclosure of refractory material generally indicated at 10 is surrounded on the top and sides by an inner cover 12 and an outer cover 14 both covers being made from a high temperature metal alloy. The bottom 16 of enclosure 10 is mounted on plate 18 by way of ceramic spacers 20, plate 18 forming the bottom for inner metal cover 12. Plate 18 in turn is mounted on plate 22 which forms the bottom for outer cover 14, and is separated therefrom by ceramic spacers 24. Plate 22 is mounted on a transite base 26 by spacers 28. Top 30 and sides 32 of ceramic cube 10 are fastened together and attached by ceramic spacers 34 to inner cover 12, which in turn is attached by ceramic spacers 36 to outer cover 14.

By constructing the furnace in this fashion, the top and sides of the refractory cubical enclosure, and the covers associated therewith may be lifted from the bottom 16, to expose the interior of the furnace thus permitting access thereto. Although air in the space between inner metal cover 12 and outer cover 14 provides some insulation for the furnace, the space is purposely not filled with better insulating material to insure that the furnace may be rapidly heated and cooled to achieve fast flake production. Guide rods 38 attached to the sides of outer cover 14 interfit with holes 40 in base 26 to position the cover 14, and parts attached thereto when placing the cover in position. The bottom 16, top 30 and sides 32 of the cubical enclosure all have wires 42 on their interior surfaces 16a, 30a and 32a connected to a source of electrical energy (not shown) to heat the furnace interior.

In the furnace interior spacers 44 support an Alundum plate 46 in which there is a hole 46a above the bottom 16 of the furnace. A thin platinum plate 48 separated from plate 46 by spacers 50 acts as a radiation shield for a thermocouple 52 attached to its lower surface 48a and the wires 54 which connect the thermocouple 52 to an electrical circuit (not shown) are led out through the hole 46a in the plate 46, hole 16b and the holes 18a, 22a and 26a in the plates 18 and 22 in base 26 respectively. A lower glass plate 56 is separated by spacers 58 from the platinum radiation shield 48. A plurality of curled flakes 60 are arranged on the upper surface 56a of the glass plate 56 and a second glass plate 62 is supported on the upper curled edges of the flakes 60. Both sides of plate 62 are ground and polished so that its upper surface 62a can also be used for flattening purposes; thus a plurality of flakes are also disposed thereon. This can continue with additional plates, as shown at 64 and 66 as desired. A rod 68 of ceramic material is inserted through the passage formed by the holes 14a and 12a in metal covers 14 and 12 and the hole 30b in top 30 of the refractory cubical for purposes to be hereinafter described.

When the plates and the flakes have been stacked in the furnace as described above and the removable portion of the furnace which includes the sides 32 and top 30 of the refractory cubical has been set in place, the temperature of the furnace is raised by energizing wire 42 to between 800 and 1050° C. The ceramic rod 68 is lowered into the furnace, but before it touches the upper plate 66, it is allowed to reach the same temperature as the plates. When the rod reaches this temperature, the end is placed against the top plate 66, and a weight of approximately 1 lb. is hung on it and allowed to remain for between 3 and 5 minutes before removal. A higher pressure may be applied to the rod when the weight is applied and removed, as by the operator giving a firm push on the rod. Alternatively, a much higher pressure may be applied by a hydraulic press for a short period of time such as a few seconds. If this latter method of pressure application is used, it is unnecessary to apply a low pressure for a longer period such as 3–5 minutes. The flakes become ductile at the temperatures mentioned and are plastically deformed by the pressure applied to them; thus they assume the shape of the plates between which they are inserted. During heating and cooling of the furnace the pressure that can be applied to the plate-flake stack is limited since the flakes must expand and contract with respect to the plates. After the rod is removed, the furnace is shut off and the inner chamber is allowed to cool rapidly because of the lack of insulating material between covers 12 and 14. Although the furnace may be allowed to cool to room temperature, it can be safely opened when the temperature has dropped to about 800° C. When the flakes are removed from the furnace at the conclusion of this process, the great majority will be flat to within less than 10 microns, and few, if any, will be broken.

Although the invention has been described with respect to flattening curled flakes resulting from the sintering process, if the plate upon which the flakes are placed is curved and the upper plate is shaped to interfit therewith, the flakes will acquire this curved shape. V-shaped flakes can also be made by having a plurality of V's cut out of the upper surface of the lower plate and shaping an upper plate to match the notches in the lower plate.

Thus I have described an improved method for precisely shaping sintered flakes of thermally sensitive material to adapt them for use in high speed thermistor bolometers. In addition my method can be used to shape thermistor flakes for attachment to curved surfaces with cement layers of minimum uniform thickness. This has been accomplished by placing the curled flakes between ground and polished surfaces of high temperature glass, fused silica or sapphire, heating the plates and the flakes to a temperature above that at which the flakes will soften and applying pressure as herein described to shape the flakes to the surfaces of the plates between which they are sandwiched.

It will thus be seen that the objects set forth above, among those made apparent from the preceding description, are efficiently attained and since certain changes may be made in carrying out the above method without departing from the scope of the invention, it is intended that all matter contained in the above description shall be interpreted as illustrative and not in a limiting sense.

It is also to be understood that the claims are intended to cover all the generic and specific features of the invention herein described, and all statements of the scope of the invention which, as a matter of language, might be said to fall therebetween.

I claim:

1. A method of changing the shape of sintered flakes of thermally sensitive resistance material which comprises placing said flakes on a glass plate having a shaped surface and a coefficient of expansion similar to that of said flakes, placing a second glass plate having a similar coefficient of expansion above said first-mentioned glass plate by supporting it on said flakes, heating said first and said second plates with said flakes between them to a temperature above the flake softening temperature, applying pressure to the plates when said flakes are in a softened condition whereby said flakes assume the shape of said plate surfaces, and cooling said flakes while they remain between said plates.

2. A method of flattening curled and sintered flakes of resistance material which comprises placing said flakes on a first glass plate having a flat surface and a coefficient of expansion similar to that of said flakes, supporting a second flat glass plate of corresponding thermal expansion characteristics on said flakes, heating said flakes to above the flake softening temperature, applying pressure to said plates while said flakes are above the flake softening temperature, whereby said flakes are flattened, and cooling said flakes to room temperature while remaining between said plates.

3. A method of flattening curled sintered flakes of thermally sensitive resistance material having a predetermined coefficient of expansion which comprises placing said flakes on a first glass plate having a flat surface, said plate being made of glass having a high percentage of silica and a similar coefficient of expansion to that of said flakes, supporting a second flat surface glass plate having a corresponding coefficient of expansion on said flakes, heating said flakes to above the flake softening temperature, applying pressure to said flakes while said flakes are above the flake softening temperature, whereby said flakes are flattened, and cooling said flakes to room temperature while remaining between said plates.

4. The method defined in claim 3 in which said plates are made of synthetic sapphire having a coefficient of expansion approximating said predetermined expansion coefficient of said sintered flakes.

5. A method of changing the shape of sintered flakes of resistance material having a predetermined coefficient of expansion which comprises placing said flakes on a plate of refractory material having a shaped surface and a similar coefficient of expansion, placing a second plate of refractory material having a corresponding coefficient of expansion above said first-mentioned plate and supporting it on said flakes, heating said first and said second plates with said flakes between them to a temperature of at least 800° C., holding said flakes and said plates at said temperature while applying pressure to said plates, whereby said flakes assume the shape of said plate surfaces and cooling said flakes while they remain between said plates.

6. A method of flattening curled sintered flakes of thermally sensitive resistance material of predetermined thermal expansion characteristics which comprises placing said flakes on a first plate of refractory material having a flat surface and similar thermal expansion characteristics, supporting a second plate of refractory material having a flat surface and corresponding expansion characteristics on said flakes, heating said flakes to above the flake softening temperature, applying a pressure of not more than 5 lbs. to said plate for a period of not more than 5 minutes while said flakes are above the flake softening temperature whereby said flakes are flattened, and cooling said flakes while they remain between said plates.

7. A method of flattening curled sintered flakes of resistance material having a predetermined thermal coefficient of expansion, which comprises placing said flakes on a first flat surface plate of glass containing at least 96 percent of silica and having a thermal coefficient of expansion similar to that of said sintered flakes, supporting a second plate of similar glass having a flat surface on top of said flakes, heating said flakes and said plates to a temperature in the range between 800° C. and 1050° C., applying a pressure of not more than 5 lbs. to the said second glass plate for a period of between 3 and 5 minutes while said flakes are at said temperature, whereby said flakes are flattened and allowing said flakes to cool to room temperature while remaining between said plates.

8. A method of flattening curled sintered flakes of resistance material having a predetermined thermal coefficient of expansion, which comprises placing a plurality of said flakes on a glass plate having a flat surface and a similar coefficient of expansion, supporting a second glass plate having a flat surface on said flakes, heating said flakes to above the flake softening temperature, causing a ceramic rod heated to the same temperature as said plates to engage the second plate, applying an initial pressure of not more than 5 pounds for not more than ½ minute to said rod, thereafter applying a pressure of not more than 1 pound for not more than 5 minutes to said rod, and then applying a final pressure of not more than 5 pounds for not more than ½ minute, whereby said flakes are flattened, removing said rod from engagement with said second plate, and cooling said plates and said flakes to room temperature while said flakes remain between said plates.

References Cited in the file of this patent

UNITED STATES PATENTS

| | | |
|---|---|---|
| 958,813 | Kelly | May 24, 1910 |
| 1,398,926 | Waite | Nov. 26, 1921 |
| 1,497,799 | Slingluff | June 17, 1924 |
| 1,787,460 | Wilcox | Jan. 6, 1931 |
| 1,942,251 | Mains | Jan. 2, 1934 |
| 2,440,187 | Silverberg | Apr. 20, 1948 |
| 2,470,461 | Black | May 17, 1949 |
| 2,482,698 | Tillyer | Sept. 20, 1949 |

FOREIGN PATENTS

| | | |
|---|---|---|
| 520,076 | France | June 20, 1921 |
| 606,649 | Great Britain | Aug. 18, 1948 |